United States Patent Office 3,106,586
Patented Oct. 8, 1963

3,106,586
METHOD OF PREPARING CYCLOPENTADIENE SULFIDES
Victor Mark, Olivette, Mo., assignor to Monsanto Chemical Company, St. Louis, Mo., a corporation of Delaware
No Drawing. Filed Oct. 23, 1961, Ser. No. 147,083
15 Claims. (Cl. 260—609)

This invention relates to new methods of preparing useful compounds having biological properties and possessing utility as intermediates in the preparation of insecticides. These compounds possess the structure

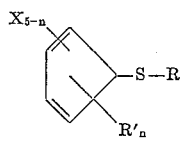

wherein $n$ is an integer from zero (0) to three (3); wherein X is selected from the class of radicals consisting of chlorine, bromine, fluorine, iodine, alkoxy radicals having up to twelve carbon atoms and radicals such that two substituents on adjacent unsaturated carbon atoms of the cyclopentadiene form cyclic radicals of four to six carbon atoms and said radicals containing substituents of the group consisting of chlorine, bromine, fluorine and iodine; and wherein R and R' are organic radicals of the group consisting of hydrocarbon radicals having up to 20 carbon atoms and selected from the group consisting of alkyl, alkenyl, alkynyl, cycloaliphatic, hydrocarbon substituted cycloaliphatic (particularly the alkyl substituted) aryl, hydrocarbon substituted aryl (particularly the aliphatic and araliphatic substituted aryl), araliphatic, hydrocarbon substituted araliphatic radicals (particularly the aliphatic substituted araliphatic radicals), and the said hydrocarbon radicals containing substituents of the group consisting of chlorine, bromine, fluorine, iodine, hydrocarbonoxy (particularly alkoxy, aryloxy and aralkoxy), nitro, cyano, thiocyano, isocyano, mercapto, hydroxyl, acyloxy, isothiocyano, acyl, hydrocarbonoxycarbonyl, hydrocarbonthio (particularly the alkylthio, arylthio and aralkylthio), amino, hydrocarbonamino, hydrocarbonsulfonyl, hydrocarbonsulfinyl radicals, the heterocyclic substituents, furyl, thiophenyl, pyridyl, piperidyl, morpholyl, tetrahydrofuryl, dihydrofuryl, tetrahydrothiophenyl and dihydrothiophenyl, the hydrocarbon and acyl groups of said substituents having up to 20 carbon atoms.

The novel method of preparing these compounds involves the reaction of a halocyclopentadiene with an organic thioester of trivalent phosphorus in accordance with the following equation:

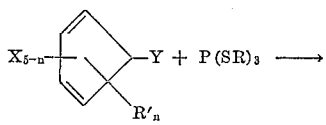

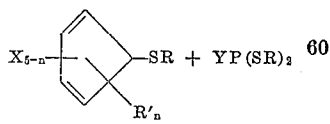

wherein Y is selected from the group consisting of chlorine, bromine, fluorine and iodine.

Suitable halocyclopentadienes which may be used in the practice of this invention are:

Hexachlorocyclopentadiene

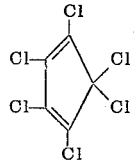

Hexabromocyclopentadiene

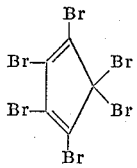

1,2,3,4-tetrachloro-5,5-difluorocyclopentadiene

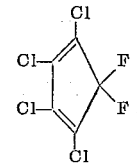

1,2-dichloro-3,4,5,5-tetrafluorocyclopentadiene

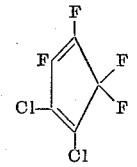

and other halocyclopentadienes such as:

1,2,3,4,5-pentachlorocyclopentadiene

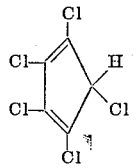

1,3,4-trichloro-2-methoxy-5,5-difluorocyclopentadiene

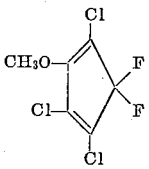

1,1,3-trichloroindene

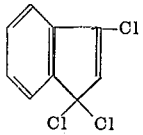

1,1,3-tribromindene

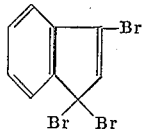

Perchloroindene

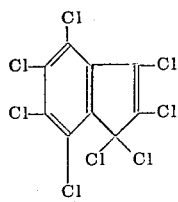

9,9-dichlorofluorene

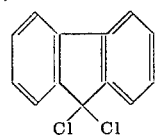

Bis(pentachloro-2,4-cyclopentadien-1-yl)

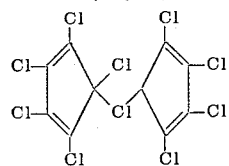

In addition to above enumerated halogen substituted cyclopentadienes, all of which are reported in the literature, other hexahalocyclopentadienes may be used, such as hexafluorocyclopentadiene and hexaiodocyclopentadiene. Useful compounds include other mixed hexahalocyclopentadienes, such as 1,2,3,4-tetrachloro-5,5-dibromocyclopentadiene and 1,2,3,4,5-pentabromo-5-chlorocyclopentadiene and halocyclopentadienes with fewer than six halogen atoms, for example, 5-chloro-cyclopentadiene, 5,5-dichlorocyclopentadiene, 5,5-dibromocyclopentadiene, 1,2,4,5 - tetrachloro-3,5-dimethoxycyclopentadiene, 1,2,3-trifluoro-5-chloro-5-methylcyclopentadiene, 1,2,3,4-tetramethyl-5,5-dibromocyclopentadiene, 4-phenyl-5,5-dichlorocyclopentadiene, 9-chloro-9-bromofluorene, 1-chloroindene, 1,4-dimethoxy-5,5-diiodocyclopentadiene, 1,2,4,5,5-pentafluorocyclopentadiene, 1,2,4,5-tetrachloro - 3,5- bis- (methylthio)cyclopentadiene, 1,2,3,5-tetrachloro-4,5-bis-(dimethylamino)cyclopentadiene.

The essential characteristic of the useful compounds is the presence of a halogen atom on the allylic carbon atom (the carbon atom which is not involved in a carbon to carbon double bond of the cyclopentadiene nucleus). In addition to the specific compounds defined in the two preceding paragraphs, a wide variety of other substituents may appear on the cyclopentadiene structure.

The useful compounds may be described by the structure

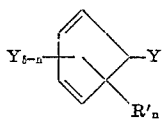

wherein X, R', Y and $n$ are as above described. Examples of the broad type not defined specifically in the preceding paragraphs are
3,4,5-trichloro-1,2,5-trimethylcyclopentadiene,
1,4,5,5-tetrachloro-2,3-diphenylcyclopentadiene,
2-benzyl-1,4,5-dichloro-3,5-ethylcyclopentadiene,
2-acetylethyl-1,3,5-trichloro-4,5-dimethylcyclopentadiene,
1,2,4,5,5-pentachloro-3 - dimethylaminoethylcyclopentadiene
and other cyclopentadienes which have at least one halogen atom on the 5 carbon atom and substituted in the 1,2,3,4 and 5 position the same or different R' substituents as defined above.

Suitable thioesters of trivalent phosphorus are compounds of the structure $$Z_mP(SR)_{3-m}$$

wherein Z is selected from the group consisting of hydrogen, chlorine, bromine, fluorine and iodine and the radicals R as above defined. The R may be any hydrocarbon radical containing up to 20 carbon atoms; including the alkyl radicals, as in
methyl phosphorotrithioite, ethyl phosphorotrithioite, n-propyl phosphorotrithioite, isopropyl phosphorotrithioite, t-butyl phosphorotrithioite, pentyl phosphorotrithioite, dodecyl phosphorotrithioite, and
ethylhexadecyl phosphorotrithioite;
the alkenyl radicals, as in
allyl phosphorotrithioite, isopropenyl phosphorotrithioite, methallyl phosphorotrithioite, crotyl phosphorotrithioite, undecenyl phosphorotrithioite, octadecenyl phosphorotrithioite, piperylenyl phosphorotrithioite, and
sorbyl phosphorotrithioite;
the alkynyl radicals, as in
propargyl phosphorotrithioite, tetrolyl phosphorotrithioite, and
octadecynyl phosphorotrithioite;
the araliphatic radicals, as in
benzyl phosphorotrithioite, phenethyl phosphorotrithioite, cinnamyl phosphorotrithioite, and
phenylhexadecyl phosphorotrithioite;
the hydrocarbon substituted araliphatic radicals, as in
2,4-dimethyl benzyl phosphorotrithioite, p-cyclohexylphenethyl phosphorotrithioite and
p-isopropyl cinnamyl phosphorotrithioite;
the aryl radicals, as in
phenyl phosphorotrithioite, naphthyl phosphorotrithioite and
biphenyl phosphorotrithioite;
the hydrocarbon substituted aryl radicals, as in
2,4-dimethyl phenyl phosphorotrithioite, 2-allylnaphthyl phosphorotrithioite, p-cumenyl phosphorotrithioite and cyclopentylphenyl phosphorotrithioite;
the cycloaliphatic radicals, as in
cyclohexyl phosphorotrithioite, cyclopentyl phosphorotrithioite, cyclohexenyl phosphorotrithioite, cyclopentenyl phosphorotrithioite, cycloheptyl phosphorotrithioite and cyclooctyl phosphorotrithioite; the hydrocarbon substituted cycloaliphatic radicals, as in
phenylcyclopentyl phosphorotrithioite, benzylcyclooctyl phosphorotrithioite, propylcyclohexyl phosphorotrithioite, and the dimethyl cycloheptenyl phosphorotrithioite;
and the said hydrocarbon radicals containing substituents of the group consisting of chlorine, as in
2-chloroethyl phosphorotrithioite, 2,4-dichlorophenyl phosphorotrithioite, p-chlorobenzyl phosphorotrithioite;
bromine, as in
3-bromobutyl phosphorotrithioite, 2-bromo-4-chlorobenzyl phosphorotrithioite and
2,4,5-tribromophenyl phosphorotrithioite;
iodine substituents, as in 2,4,6-triiodo benzyl phosphorotrithioite and p-iodophenyl phosphorotrithioite; fluorine, as in trifluoroethyl phosphorotrithioite and p-fluorobenzyl phosphorotrithioite; the nitro radical, as in m-nitrobenzyl phosphorotrithioite, the cyano radical, as in cyanoethyl phosphorotrithioite; the isocyano radical, as in 3-cyanoisopropyl phosphorotrithioite; the thiocyano radical, as in thiocyanobenzyl phosphorotrithioite; the isothiocyano radical, as in p-isothiocyanophenyl phosphorotrithioite and 2-isothiocyanoethyl phosphorotrithioite; the hydroxyl radical, as in p-hydroxyphenyl phosphorotrithioite and 2,3-dihydroxypropyl phosphorotrithioite; the hydrocarbonoxy radical, as in p-methoxyphenyl phosphorotrithioite, p-2-decycloxyethyl phosphorotrithioite and p-phenoxybenzyl phosphorotrithioite; the acyloxy radical, as in the o-acetyloxyphenyl phosphorotrithioite, the acyl radical, as in 2-acetylethyl phosphorotrithioite and p-butyrylbenzyl phosphorotrithioite; the hydrocarbonoxycarbonyl radical, as in hexyloxycarbonylethyl phosphorotrithioite, phenoxycarbonylphenyl phosphorotrithioite and methoxycarbonylcyclohexyl phosphorotrithioite; the hydrocarbonthio radical, as in 4-ethylthiobutyl phosphorotrithioite, 3-phenylthiopropyl phosphorotrithioite and cyclohexylthiophenyl phosphorotrithioite; the amino radical, as in p-aminophenyl phosphorotrithioite, the hydrocarbonamino radical, as in dimethylaminoethyl phosphorotrithioite, 2 - anilinoethyl phosphorotrithioite, and p-cyclohexylaminobenzyl phosphorotrithioite; the hydrocarbon sulfonyl radical, as in o-dodecylsulfonylbenzyl phosphorotrithioite; p-phenylsulfonyl phenyl phosphorotrithioite, 2-benzylsulfonylethyl phosphorotrithioite and p-cyclohexylsulfonylbenzyl phosphorotrithioite; the hydrocarbon sulfinyl radical, as in 3(2-ethylhexylsufinyl)propyl phosphorotrithioite, p-phenylsulfinylphenyl phosphorotrithioite and 2-cyclohexylfinylpropyl phosphorotrithioite; and the heterocyclic radical, as in furfuryl phosphorotrithioite, thenyl phosphorotrithioite, tetrahydrofurfuryl phosphorotrithioite, 2-morpholylethyl phosphorotrithioite, p-pyridylphenyl phosphorotrithioite and 3-piperidylpropyl phosphorotrithioite.

The above thioites are of the structure $$Z_mP(SR)_{3-m}$$

wherein $m$ is zero. However, the thioites in which $m$ is one (1) are also useful, for example, ethyl phenylphosphonodithioite, 3-cyanopropyl benzylphosphonodithioite, trifluoromethyl ethylphosphonodithioite, phenyl ethylphosphonodithioite, allyl allylphosphonodithioite, cyclohexyl hexadecylphosphonodithioite, crotyl p-chlorobenzyl phosphonodithioite, p-iodophenyl 2-ethylhexylphosphonodithioite, 2 - chloroethyl p-cyanophenylphosphonodithioite, 3 - isothiocyano o-acetyloxyphenylphosphonodithioite, 3-nitrobutyl hexyloxycarbonylethylphosphonodithioite, methyl tetrahydrofurfurylphosphonodithioite, p - hydroxybenzyl dodecylphosphonodithioite, p-cyclohexylaminobenzyl ethylphosphonodithioite, 2-morpholylethyl n-decylphosphonodithioite, 4-ethylthiobutyl furylphosphonodithioite, p-methoxyphenyl benzylphosphonodithioite, 2-acetyloxyethyl methoxycarbonylcyclohexylphosphonodithioite, p-aminophenyl tetradecylphosphonodithioite and t-butyl 2-diethylaminoethylphosphonodithioite.

The thioites described generically in the above formula may be those in which the symbol $m$ is two (2), for example, ethyl di(m-nitrobenzyl)phosphinothioite, p-methoxyphenyl diethylphosphinothioite, o-acetylnaphthyl di(phenoxycarbonyl)phosphinothioite, cyclohexyl diallylphosphinothioite, furfuryl di-n-octylphosphinothioite, p-phenylsulphonylphenyl diisodecylphosphinothioite, dimethylaminoethyl di(3 - piperidylpropyl)phosphinothioite, o-dodecylsulfonylbenzyl diamylphosphinothioite, 2-anilinoethyl dicyclohexylphosphinothioite, and p-2-decyloxyethyl methylethylphosphinothioite.

The reaction between the halocyclopentadiene and the organic thioester of the trivalent phosphorus is often spontaneous and runs to completion by the simple mixing of the reactants. The extent of the conversion can be followed readily by the physical and spectral properties of the products, including nuclear magnetic resonance spectroscopy which is especially useful for the quantitative analysis of the reaction mixture. A spontaneous reaction is exemplified by the interaction of hexachlorocyclopentadiene with triethyl phosphorotrithioite:

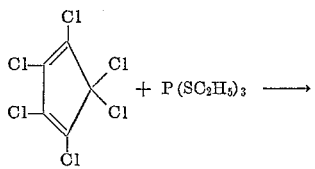

Nuclear magnetic resonance spectroscopy indicates a large change in the chemical shift on mixing the two reactants and the essentially quantitative disappearance of triethyl phosphorotrithioite and the formation of chlorodiethylphosphorodithioite. Concomitantly hexachlorocyclopentadiene is transformed into ethyl 1,2,3,4,5-pentachlorocyclopentadienyl sulfide.

A reaction which is not immediately spontaneous is exemplified between the reaction of 1,2,3,4,5-pentachloro-5-ethylcyclopentadiene and trimethyl phosphorotrithioite (trimethyl thiophosphite) and between hexachlorocyclopentadiene and triphenylphosphorotrithioite, and are treated in detail among the examples. In the later cases, heat may be applied to the system until the equilibrium is obtained. Although the equilibrium lies often far to the right, it is sometimes advantageous to push the reaction to completion by eliminating one of the reaction products, usually the halothiophosphite, by, for instance, one of the physical means known to the art, especially distillation. The reaction can be conducted with and without the use of a solvent, at and above and below atmospheric pressure, preferentially in the absence of moisture and often under a neutral gas blanket to prevent the oxidation of the phosphorus compound. The temperature of the reaction encompasses a wide range due mainly to the wide reactivities of the reaction partners. The most often encountered range comprises the temperature scale between 20 and 200° C. but with extreme reactants may be above or below that range. Workup of the reaction mixture may be as varied as the physical and sometimes chemical properties of the two coproducts are. Often the phosphorus-containing product has a lower boiling point than the halocyclopentadienyl sulfide and in this case a separation can be achieved through fractionation. Sometimes the non-phosphorus product is crystalline and thus separation using the varied crystallization techniques can advantageously be carried out. In cases when the emphasis is on high purity preparations the separation of the phosphorus component can readily be done due to its ready hydrolysis eventually to water soluble products. Valuable tools in separating the phosphorus from the halocyclopentadiene product are the various chromatographic methods, among which elution chromatography over alumina seems to be especially useful.

Further details of the preparation and separation of the halocyclopentadienyl sulfides are set forth in the specific examples.

*Example I*

Hexachlorocyclopentadiene, 27.3 g. was mixed with 21.5 g. of ethyl phosphorotrithioite; a sudden color change and rising temperature indicated that a spontaneous reaction has taken place. During a period of 5 minutes the temperature reached a maxium of 57° C. The orange colored, clear solution was heated for one hour between 90 and 100° C., then fractionated through a one-inch column, filled with glass helices. A colorless, mobile distillate, 8.5 ml., was collected at 39° and 0.4–0.8 mm., and identified as $(C_2H_5S)_2PCl$. The distillation residue was dissolved in pentane and chromatographed over alumina. The orange-yellow eluted material weighed 18.7 g. and had $n_D^{25}$ 1.5720; elemental analysis indicated that it is ethyl pentachloro-2,4-cyclopentadien-1-yl sulfide. The yield accordingly is 62.5% of the theory.

Calculated for $C_7H_5Cl_5S$: Cl, 59.4; S, 10.7%. Found: Cl, 57.8; S, 10.1%.

*Example II*

The procedure of Example I was repeated except that the equivalent amount of methyl phosphorotrithioite was substituted for the ethyl analog. Methyl pentachloro-2,4-cyclopentadien-1-yl sulfide was obtained as an orange oil, $n_D^{25}$ 1.5808.

*Example III*

The procedure of Example I was repeated with hexyl phosphorotrithioite being substituted for the ethyl analog.

Hexyl pentachloro-2,4-cyclopentadien-1-yl sulfide was obtained as an orange oil, $n_D^{25}$ 1.5583.

*Example IV*

The procedure of Example I was repeated, except that the equivalent amount of diethyldithiophosphorochloridite, $(C_2H_5S)_2PCl$, was substituted for ethyl trithiophosphite and the mixture was heated at 110° for 3 hours. Stripping off the coproduct $C_2H_5SPCl_2$ left a brown-orange oil as residue, which, after chromatography yielded ethyl pentachloro-2,4-cyclopentadien-1-yl sulfide, identical to the product of Example I.

*Example V*

A mixture of 6.1 g. of hexachlorocyclopentadiene and 8.0 g. of phenyl phosphorotrithioite was heated gradually in the course of 3.5 hours from room temperature to 85°; during this period the solid thiophosphite went into solution and the mixture acquired a brown color. After cooling to room temperature a small amount of solid was filtered off and the oil chromatographed over alumina, using pentane eluent. An orange oil, $n_D^{25}$ 1.6168, was found to be pentachloro-2,4-cyclopentadien-1-yl phenyl sulfide by elemental analysis and its spectral properties.

Calculated for $C_{11}H_5Cl_5S$: Cl, 51.2; S, 9.2%. Found: Cl, 51.8; S, 8.9%.

The product had $\lambda$max (isooctane) 304 and 345m$\mu$ with $\epsilon$=1880 and 1895, respectively.

*Example VI*

The procedure of Example 5 was repeated except that p-chlorophenyl phosphorotrithioite was substituted for phenyl phosphorotrithioite. Workup of the reaction mixture yielded p-chlorophenyl pentachloro-2,4-cyclopentadien-1-yl sulfide $n_D^{25}$ 1.6300, $\lambda$max (isooctane) 332 and 338m$\mu$, $\epsilon$=1705 and 1570, respectively.

Although the invention is described above with respect to specific embodiments, it is not intended that the details thereof be limitations on the scope of the invention except to the extent set forth in the following claims.

I claim:

1. The method of preparing compounds of the structure

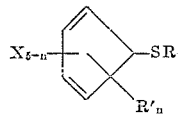

wherein $n$ is an integer from zero (0) to three (3); wherein X is selected from the group consisting of atoms of chlorine, bromine, fluorine, iodine and radicals of the group consisting of alkoxy radicals and radicals, such that two substituents on adjacent unsaturated carbon atoms of the cyclopentadiene form cyclic hydrocarbon radicals of four to six carbon atoms and the said radicals containing substituents of the group consisting of chlorine, fluorine, bromine and iodine and wherein R and R' are organic radicals of the group consisting of hydrocarbon radicals having up to 20 carbon atoms of the group consisting of alkyl, alkenyl, alkynyl, cycloalkyl, cycloalkenyl, aryl, cycloalkyl substituted alkyl, cycloalkenyl substituted alkyl, aralkyl, cycloalkyl substituted alkenyl, cycloalkenyl substituted alkenyl, aralkenyl, alkyl substituted cycloalkyl, alkyl substituted cycloalkenyl, alkylaryl, alkylaralkyl, alkenyl substituted cycloalkyl, alkenyl substituted cycloalkenyl, alkenylaralkyl, and said hydrocarbon radicals containing substituents of the group consisting of chlorine, bromine, fluorine, iodine, alkoxy, aryloxy, aralkyloxy, nitro, cyano, thiocyano, isocyano, hydroxy, acyloxy, isothiocyano acyl, alkoxycarbonyl, aryloxycarbonyl, aralkoxycarbonyl, alkylthio, arylthio, aralkylthio, amino, alkylamino, arylamino, aralkylamino, alkylsulfonyl, arylsulfonyl, aralkylsulfonyl, alkylsulfinyl, arylsulfinyl, aralkylsulfinyl, furfuryl, furyl, thiophenyl, pyridyl, piperidyl, thenyl, morpholyl, tetrahydrofuryl, tetrahydrofurfuryl, tetrahydrothiophenyl, dihydrofuryl, dihydrofurfuryl and dihydrothiophenyl, the aryl, acyl, alkyl and aralkyl groups of the said substituents having up to 20 carbon atoms; which comprises contacting a compound of the structure

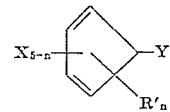

wherein Y is a halogen of the group consisting of chlorine, bromine, fluorine and iodine and wherein X, Y and $n$ are as above defined; with a compound of the structure

$Z_mP(SR)_{3-m}$ wherein $m$ is an integer from zero (0) to two (2) and wherein Z is selected from the group consisting of hydrogen, chlorine, bromine, iodine, fluorine and the R radicals.

2. The method of preparing a compound of the structure

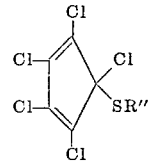

wherein R'' is a hydrocarbon radical having up to 20 carbon atoms which comprises contacting hexachlorocyclopentadiene with a compound of the structure $Z'_mP(SR'')_{3-m}$ wherein $m$ is an integer from zero (0) to two (2); and wherein Z' is a halogen radical.

3. The method of preparing a compound of the structure

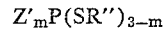

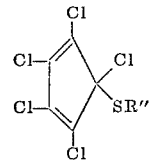

wherein R'' is a hydrocarbon radical having up to 20 carbon atoms which comprises contacting hexachlorocyclopentadiene with a compound of the structure $R''_mP(SR'')_{3-m}$ wherein $m$ is an integer from zero (0) to two (2).

4. The method of preparing a compound of the structure

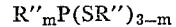

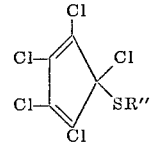

wherein R'' is a hydrocarbon radical having up to 20 carbon atoms which comprises contacting hexachlorocyclopentadiene with a compound of the structure $P(SR'')_3$.

5. The method of preparing 1,2,3,4,5-pentachlorocyclopentadien-1-yl methyl sulfide, which comprises contacting hexachlorocyclopentadiene with trimethyl phosphorotrithioite.

6. The method of preparing 1,2,3,4,5-pentachlorocyclopentadien-1-yl ethyl sulfide, which comprises contacting hexachlorocyclopentadiene with triethyl phosphorotrithioite.

7. The method of preparing 1,2,3,4,5-pentachlorocyclopentadien-1-yl isopropyl sulfide, which comprises contacting hexachlorocyclopentadiene with triisopropyl phosphorotrithioite.

8. The method of preparing 1,2,3,4,5-pentachlorocyclopentadien-1-yl t-butyl sulfide, which comprises contacting hexachlorocyclopentadiene with tri-t-butyl phosphorotrithioite.

9. The method of preparing 1,2,3,4,5-pentachloro-2,4-cyclopentadien-1-yl phenyl sulfide, which comprises contacting hexachlorocyclopentadiene with triphenyl phosphorotrithioite.

10. The method of preparing a compound of the structure

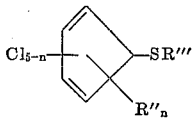

wherein each R″ and R‴ are hydrocarbon radicals having up to 20 carbon atoms, which comprises contacting a compound of the structure

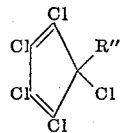

with a compound of the structure P-(SR‴)₃.

11. The method of preparing 1,2,3,5-tetrachloro-4-methyl-2,4-cyclopentadien-1-yl methyl sulfide which comprises contacting 1,2,3,4,5-pentachloro-5-methyl cyclopentadiene with trimethyl phosphorotrithioite.

12. The method of preparing 1,2,3,5-tetrachloro-4-methyl-2,4-cyclopentadien-1-yl ethyl sulfide which comprises contacting 1,2,3,4,5-pentachloro-5-methyl cyclopentadiene with triethylphosphorotrithioite.

13. The method of preparing 1,2,3,4-tetrachloro-5-isopropyl-2,4-cyclopentadien-1-yl isopropyl sulfide which comprises contacting 1,2,3,4,5-pentachloro - 5 - isopropyl cyclopentadiene with triisopropyl phosphorotrithioite.

14. The method of preparing 2,3,4,5-tetrachloro-1-methyl-2,4-cyclopentadien-1-yl isobutyl sulfide which comprises contacting 1,2,3,4,5-pentachloro-5-methyl cyclopentadiene with triisobutyl phosphorotrithioite.

15. The method of preparing 1,2,3,5-tetrachloro-4-ethyl-2,4-cyclopentadien-1-yl phenyl sulfide which comprises contacting 1,2,3,4,5-pentachloro-5-ethyl cyclopentadiene with triphenyl phosphorotrithioite.

No references cited.